US010437426B2

(12) United States Patent
Toma

(10) Patent No.: US 10,437,426 B2
(45) Date of Patent: Oct. 8, 2019

(54) SELECTION DISPLAY APPARATUS AND SELECTION DISPLAY METHOD

(71) Applicant: CASIO COMPUTER CO., LTD., Shibuya-ku, Tokyo (JP)

(72) Inventor: Kazuyoshi Toma, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 358 days.

(21) Appl. No.: 15/190,304

(22) Filed: Jun. 23, 2016

(65) Prior Publication Data

US 2017/0090696 A1   Mar. 30, 2017

(30) Foreign Application Priority Data

Sep. 24, 2015   (JP) .................................. 2015-186639

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0485* (2013.01); *G06F 3/04845* (2013.01);
(Continued)

(58) Field of Classification Search
CPC ......... G06F 2203/04803; G06F 3/0482; G06F 3/0485
See application file for complete search history.

(56) References Cited

U.S. PATENT DOCUMENTS 6,785,487 B2 * 8/2004 Maeda ............... H04N 1/00352
399/81
7,086,006 B2 * 8/2006 Subramanian .......... G06F 9/451
715/747
(Continued)

FOREIGN PATENT DOCUMENTS

CN   101300607 A   11/2008
CN   101866519 A   10/2010
(Continued)

OTHER PUBLICATIONS howtogeek.com "best-windows-7-explorer-tips-and-tricks", pp. 1-5 https://web.archive.org/web/20130520054425/http://www.howtogeek.com/76295/best-windows-7-explorer-tips-and-tricks/.*
(Continued)

*Primary Examiner* — Scott T Baderman
*Assistant Examiner* — Mario M Velez-Lopez
(74) *Attorney, Agent, or Firm* — Holtz, Holtz & Volek PC

(57) ABSTRACT

A selection display apparatus includes a display controller which makes a window area in which an item key(s) for selecting an item is(are) displayed according to categories, a window selection key area in which window selection keys for selecting a category of items to be displayed in the window area are displayed, and a specific category selecting key for selecting a specific category among the categories be displayed in a display; a first key controller which, when one window selection key among window selection keys displayed in the window selection key area is operated, makes the item key corresponding to a category indicated be displayed by the window selection key in the window area; and a second key controller which, when the specific category selecting key is operated, makes the item key corresponding to the category indicated by the specific category selecting key be displayed in the window area.

18 Claims, 8 Drawing Sheets

(51) Int. Cl.
  *G06F 3/0484* (2013.01)
  *G06F 3/0485* (2013.01)
  *G06F 3/0488* (2013.01)
(52) U.S. Cl.
  CPC ...... *G06F 3/04883* (2013.01); *G06F 3/04886* (2013.01); *G06F 2203/04803* (2013.01)

(56) References Cited

U.S. PATENT DOCUMENTS

| | | | | |
|---|---|---|---|---|
| 7,764,390 | B2* | 7/2010 | Kotani | H04N 1/00384 358/1.1 |
| 8,514,171 | B2* | 8/2013 | Jolly | G06F 1/1626 345/156 |
| 8,564,544 | B2* | 10/2013 | Jobs | G06F 3/0488 345/173 |
| 9,030,692 | B2 | 5/2015 | Maruyama et al. | |
| 9,658,751 | B2* | 5/2017 | Han | G06F 3/0484 |
| 2005/0010768 | A1* | 1/2005 | Light | G06F 21/34 713/168 |
| 2006/0206834 | A1* | 9/2006 | Fisher | G06F 3/0484 715/777 |
| 2007/0005449 | A1 | 1/2007 | Blucher et al. | |
| 2007/0016877 | A1* | 1/2007 | Shirakawa | H04N 5/44508 715/810 |
| 2007/0168859 | A1* | 7/2007 | Fortes | G06F 17/211 715/700 |
| 2007/0226190 | A1* | 9/2007 | Lorenzen | G06F 16/9577 |
| 2007/0226614 | A1* | 9/2007 | Lorenzen | G06F 16/9577 715/234 |
| 2010/0192090 | A1 | 7/2010 | Hiramatsu et al. | |
| 2013/0070295 | A1 | 3/2013 | Maruyama et al. | |
| 2013/0167089 | A1* | 6/2013 | Abe | G06F 3/04817 715/835 |

FOREIGN PATENT DOCUMENTS

| | | |
|---|---|---|
| CN | 103002184 A | 3/2013 |
| JP | 11312189 A | 11/1999 |
| JP | 2004265244 A | 9/2004 |
| JP | 4517931 B2 | 8/2010 |
| JP | 2015153373 A | 8/2015 |

OTHER PUBLICATIONS

Yu Wang "Scrolling to the row in TreeView when selected", Sep. 13, 2005, pp. 1-5 https://mail.gnome.org/archives/gtk-perl-list/2005-September/msg00061.html.*
Extended European Search Report (EESR) dated Mar. 3, 2017, issued in counterpart European Application No. 16177446.8.
Krause, "How-To Customize Chrome and Pin your Favorite Sites to the New Tab Screen", XP055349225, https://www.groovypost.com/howto/google-chrome-pin-favorites-tab/ [retrieved on Feb. 23, 2017], Nov. 3, 2012.
Wollman, "Fujitsu LifeBookT4410—A Review of the Fujitsu LifeBookT4410", XP055325722, http://www.laptopmag.com/reviews/laptops/fujitsu-lifebook-t4410 [retrieved on Dec. 2, 2016], Nov. 4, 2009.
Japanese Office Action dated Oct. 3, 2017 issued in counterpart Japanese Application No. 2015-186639.
Chinese Office Action dated Jul. 18, 2018 (and English translation thereof) issued in counterpart Chinese Application No. 201610842149.3.
Chinese Office Action (and English language translation thereof) dated May 8, 2019 issued in counterpart Chinese Application No. 201610842149.3.

* cited by examiner

| WINDOW AREA NUMBER | ITEM KEY CODE | ITEM KEY ARRANGEMENT COORDINATES(X-Y) |
|---|---|---|
| 01 | 001212 | 1-1 |
| 01 | 001213 | 1-2 |
| ~ | ~ | ~ |
| 03 | 001001 | 1-1 |
| 03 | 001002 | 1-2 |
| 03 | 001003 | 1-3 |
| 03 | 001004 | 2-2 |
| 03 | 001005 | 2-3 |
| 03 | 001006 | 3-1 |
| ~ | ~ | ~ |
| 12 | 009801 | 1-1 |
| 12 | 009802 | 2-3 |

| WINDOW SELECTION KEY CODE | WINDOW SELECTION KEY COORDINATES(X-Y) | WINDOW SELECTION KEY NAME | WINDOW AREA NUMBER |
|---|---|---|---|
| 000001 | 1-1 | UDON NOODLE | 01 |
| 000002 | 1-2 | SOBA NOODLE | 02 |
| 000003 | 2-1 | SET MENU | 03 |
| 000004 | 2-2 | CURRY | 04 |
| 000005 | 3-1 | RICE BOWL DISH | 05 |
| 000006 | 3-2 | PICKLES | 06 |
| ~ | ~ | ~ | ~ |
| 000011 | 6-1 | SIMMERED DISH | 11 |
| 000012 | 6-2 | BEER | 12 |

| SHORTCUT KEY CODE | SHORTCUT KEY COORDINATE(X) | WINDOW SELECTION KEY CODE |
|---|---|---|
| 900001 | 1 | 000003 |
| 900002 | 2 | 000005 |
| 900003 | 3 | 000012 |

| ITEM KEY CODE | ITEM NAME |
|---|---|
| 001212 | SIMPLE UDON NOODLE |
| 001213 | UDON NOODLE WITH TEMPURA |
| ~ | ~ |
| 001001 | A SET MENU |
| 001002 | B SET MENU |
| 001003 | C SET MENU |
| 001004 | CUTLET SET MENU |
| 001005 | STEW SET MENU |
| 001006 | SPECIAL SET MENU |
| ~ | ~ |
| 009801 | DRAFT BEER |
| 009802 | SHOCHU WITH SODA |

SELECTION DISPLAY APPARATUS AND SELECTION DISPLAY METHOD

BACKGROUND OF THE INVENTION

1. Field of the Invention

The present invention relates to a selection display apparatus and a selection display method.

2. Background Art

Conventionally, ECRs (Electronic Cash Registers) have been known as sales data processing apparatuses for processing sales data registration of items and the like. Touch panel type ECRs have been also known. For example, Japanese Patent No. 4517931 discloses a sales data processing apparatus in which the sales data of the sales data processing apparatus can be seen on a server apparatus by using an all-purpose protocol. Moreover, Japanese Patent Application Laid-Open Publication No. 2015-153373 discloses a sales data processing apparatus which displays an input screen in which the specific area is enlarged if the operator using the apparatus is not used to using the ECR and displays an input screen in which the specific area is scaled down if the operator using the apparatus is used to using the ECR.

In the conventional touch panel type ECRs, the contents of the corresponding display target are to be displayed in the display screen when a tab or a selection key is pressed. Further, the entire area where a tab and a selection key are displayed can be made to slide in the up and down directions or in the left and right directions following the swiping operation on the display screen. Therefore, in the case where the tab or the selection key which an operator wishes to operate is not shown in the display screen, the entire area has to be made to slide in the up and down direction or in the left and right direction by the swiping operation in order to make the target tab or selection key be displayed. When operating frequently used tabs and selection keys, this swiping operation can be troublesome, and the contents of a desired display target cannot be displayed efficiently.

SUMMARY OF THE INVENTION

An object of the present invention is to efficiently display the contents of a desired display target.

There is provided a selection display apparatus, including: a display controller which makes (i) a window area in which one or a plurality of item keys for selecting an item are displayed according to categories, (ii) a window selection key area in which a plurality of window selection keys for selecting a category of items which is to be displayed in the window area are displayed, and (iii) a specific category selecting key for selecting a specific category among the categories be displayed in a display; a first key controller which, when one window selection key among the plurality of window selection keys which are displayed in the window selection key area is operated, makes the item key corresponding to a category indicated by the window selection key be displayed in the window area; and a second key controller which, when the specific category selecting key is operated, makes the item key corresponding to the category indicated by the specific category selecting key be displayed in the window area.

There is provided a selection display method, including: display controlling which makes (i) a window area in which one or a plurality of item keys for selecting an item are displayed according to categories, (ii) a window selection key area in which a plurality of window selection keys for selecting a category of items which is to be displayed in the window area are displayed, and (iii) a specific category selecting key for selecting a specific category among the categories be displayed in a display; first key controlling which, when one window selection key among the plurality of window selection keys which are displayed in the window selection key area is operated, makes the item key corresponding to a category indicated by the window selection key be displayed in the window area; and second key controlling which, when the specific category selecting key is operated, makes the item key corresponding to the category indicated by the specific category selecting key be displayed in the window area.

According to the present invention, the contents of a desired display target can be displayed efficiently.

BRIEF DESCRIPTION OF THE DRAWINGS

The above and other objects, advantages and features of the invention will become more fully understood from the detailed description given hereinbelow and the appended drawings which are given by way of illustration only, and thus are not intended as a definition of the limits of the present invention, and wherein:

FIG. 5 shows a configuration of a window area setting table;

FIG. 6 shows a configuration of a window selection key area setting table;

FIG. 7 shows a configuration of a shortcut key setting table;

FIG. 8 shows a configuration of an item key setting table;

DETAILED DESCRIPTION OF THE PREFERRED EMBODIMENTS

Figure 1:
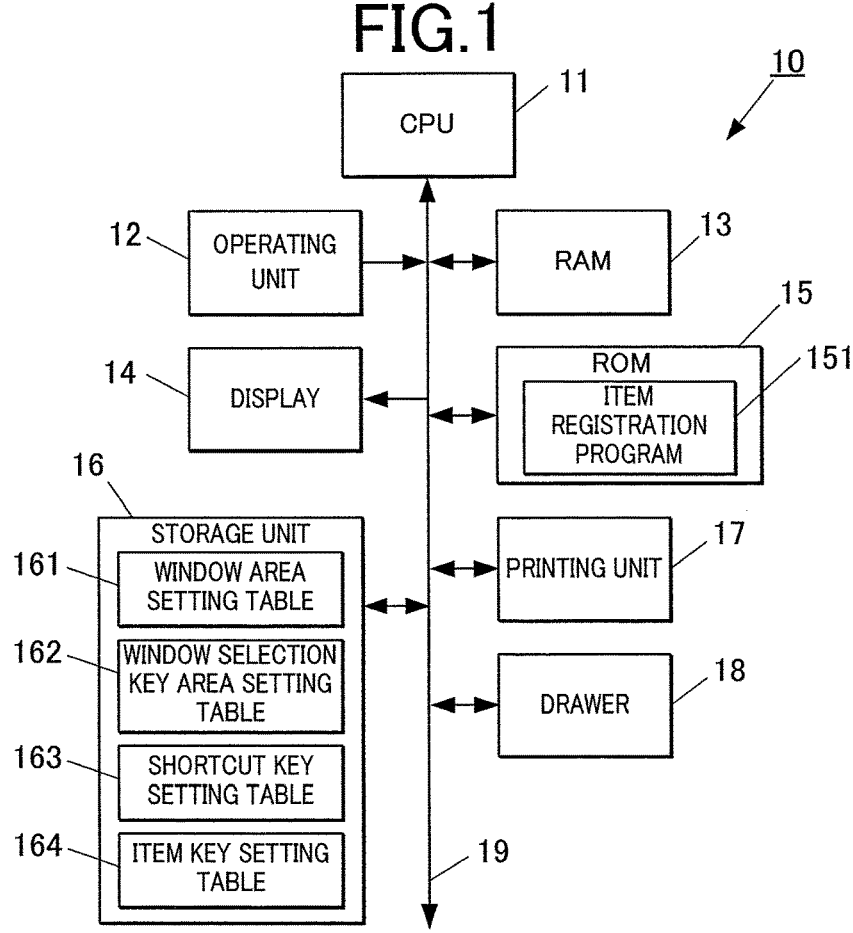
FIG. 1 is a block diagram showing the ECR configuration of an embodiment of the present invention.

Hereinafter, an embodiment of the present invention will be described with reference to the drawings. Here, the present invention is not limited to the examples shown in the drawings.

First, the apparatus configuration of the embodiment will be described with reference to FIG. 1. FIG. 1 is a block diagram showing the configuration of the ECR (Electronic Cash Register) 10 as a sales data processing apparatus of the embodiment.

The ECRs 10 are installed in shops and stores such as convenience stores, private shops, retail shops, restaurants, eateries and the like. Each ECR 10 is a sales data processing apparatus such as an electronic cash register, an POS terminal or the like which performs processing such as sales data registration of items in accordance with operation performed by an operator (user) such as a working staff.

As shown in FIG. 1, the ECR 10 includes: a CPU (Central Processing Unit) 11 as a display controller, a first key controller and a second key controller; an operating unit 12; a RAM (Random Access Memory) 13; a display 14 as a display unit; a ROM (Read Only Memory) 15; a storage unit 16; a printing unit 17 and a drawer 18. These components of the ECR 10 are connected to each other via a bus 19.

The CPU 11 controls the individual components of the ECR 10. Among the system programs and the application programs which are stored in the ROM 15, the CPU 11 reads a specified program. In such way, the CPU 11 executes various processing in cooperation with the programs.

The operating unit 12 is a touch panel which is formed integrally with the display 14. The operating unit 12 receives a touch input performed by an operator on the screen of the display 14 and outputs the operating information to the CPU 11.

The RAM 13 is a volatile memory and includes a work-area in which various data and programs are temporarily stored. The display 14 is a LCD (Liquid Crystal Display), an EL (Electroluminescent) display or the like, and performs various display in accordance with the display information instructed by the CPU 11.

Various data and programs are stored in the ROM 15. The ROM 15 is a memory exclusively used for reading out information. In the ROM 15, the item registration program 151 is stored. The storage unit 16 is configured of a flash memory, an EEPROM (Electrically Erasable Programmable Read Only Memory) or the like, and is an information readable and writable memory. In the storage unit 16, the after-mentioned window area setting table 161, window selection key area setting table 162, shortcut key setting table 163 and item key setting table 164 are stored.

The printing unit 17 is configured of a thermal wax transfer printer which performs printing on a roll of recording paper, for example. The printing unit 17 issues receipts and journals by printing various information on a roll of recording paper in accordance with the instructions of the CPU 11.

The drawer 18 includes a drawer part in which cash, gift certificates, etc. are stored and an open part. The drawer 18 operates so that the open part releases the drawer part in accordance with the instruction of the CPU 11. The released drawer part is to be manually closed by an operator after cash is stored therein.

Next, with reference to FIGS. 2 to 8, the main display screens and various types of setting tables which are stored in the storage unit 16 will be described.

Figure 2:
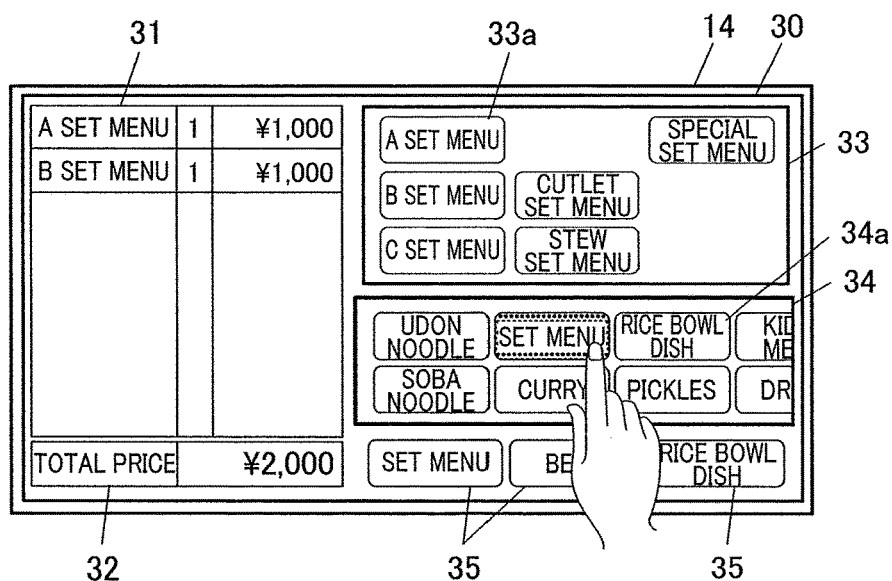
FIG. 2 shows a configuration of a selection display screen.

FIG. 2 shows a configuration of the selection display screen 30. FIGS. 3A, 3B, 4A and 4B show examples of selection display in the selection display screen 30. FIG. 5 shows a configuration of the window area setting table 161. FIG. 6 shows a configuration of the window selection key area setting table 162. FIG. 7 shows a configuration of the shortcut key setting table 163. FIG. 8 shows a configuration of the item key setting table 164.

The selection display screen 30 which is displayed in the display 14 will be described with reference to FIG. 2. The selection display screen 30 is, for example, the selection display screen where a window in which the items (products) that belong to the category (for example, "set menu") which desired by an operator is selected and displayed. The selection display screen 30 includes a specification area 31, a total price area 32, a window area 33, a window selection key area 34 and three shortcut keys 35.

The specification area 31 is an area where detail information such as the number, price, etc. of the registered items is to be displayed.

The total price area 32 is an area where the total price of the registered items is to be displayed.

The window area 33 is an area where one or a plurality of item keys (product keys) 33a are displayed according to categories. The item keys 33a are keys that are used for item registration. Specifically, as shown in FIG. 2, a window in which the item keys 33a indicating "A set menu", "B set menu", "C set menu", "cutlet set menu", "stew set menu" and "special set menu" that belong to the "set menu" category are arranged at predetermined locations is to be displayed in the window area 33, for example. This window is set for each category (for example, "set menu", "udon noodle", "rice bowl dish", etc.), and the window of either one of the categories is to be displayed in the window area 33.

The window selection key area 34 is an area where a plurality of window selection keys 34a are displayed according to a predetermined arrangement. The window selection keys 34a are keys for selecting an item category (item key 33a) which is to be displayed in the window area 33.

The same number of window selection keys 34a as the number of item categories is provided in the window selection key area 34.

When one window selection key 34a among the plurality of window selection keys 34a displayed in the window selection key area 34 is operated, the item keys 33a which correspond to the category indicated by the window selection key 34a are to be displayed in the window area 33 under the control of the CPU (the first key controller) 11.

Specifically, as shown in FIG. 2, if the window selection key 34a indicating "set menu" is operated, the window in which the item keys 33a of "A set menu", "B set menu", "C set menu", . . . , "special set menu" corresponding to the "set menu" category are arranged is to be displayed in the window area 33, for example. Further, the display color of the window selection key 34a indicating "set menu" is changed to a color (for example, blue) which is different from the display color (for example, white) of the other window selection keys 34a and then, the window selection key 34a is displayed.

In the window selection key area 34, the entire window selection keys 34a can be made to slide in sideways under the control of the CPU (display controller) 11.

Specifically, the entire window selection keys 34a can be made to slide in sideways in accordance with the swiping operation in the left and right directions performed on the window selection key area 34, for example.

Further, the entire window selection keys 34a can also be made to slide in sideways in accordance with the operation of a shortcut key 35. Specifically, in the case where the window selection key 34a corresponding to the category indicated by the shortcut key 35 (for example "beer") is not displayed in the window selection key area 34 (hidden), the entire window selection keys 34a is made to slide in sideways so that the window selection key 34a indicating "beer" is to be displayed in the window selection key area 34 when the shortcut key 35 indicating "beer" is operated, for example.

The shortcut keys 35 are specific category selecting keys for selecting specific categories (for example, frequently selected categories) which are set in advance among the categories of the items (item keys 33a) to be displayed in the window area 33. That is, by a shortcut key 35 being operated, similarly to the case where the window selection key 34a corresponding to the category indicated by the shortcut key 35 is operated, the window in which the items belonging to the corresponding category are arranged can be displayed in the window area 33.

In the case where the window selection key 34a corresponding to the category indicated by a shortcut key 35 is not displayed in the window selection key area 34 (hidden), if an operator wishes to display the corresponding window in the window area 33 by operating the window selection key 34a, it is troublesome since first, a swiping operation has to be performed in the window selection key area 34 and then, the entire window selection keys 34a has to be made to slide so that the window selection key 34a which is subject to operation appears in the window selection key area 34. Meanwhile, in the case where the corresponding window is to be displayed in the window area 33 by operating the shortcut key 35, the swiping operating is not needed and the desired window can be displayed efficiently in the window area 33.

Next, examples of selection display in the selection display screen 30 if a shortcut key 35 is operated will be described with reference to FIGS. 3A and 3B and FIGS. 4A and 4B. In each of FIGS. 3A and 3B and FIGS. 4A and 4B, only the window area 33, the window selection key area 34 and the three shortcut keys 35 in the selection display screen 30 are shown, and the specification area 31 and the total price area 32 are omitted.

Figure 3A:
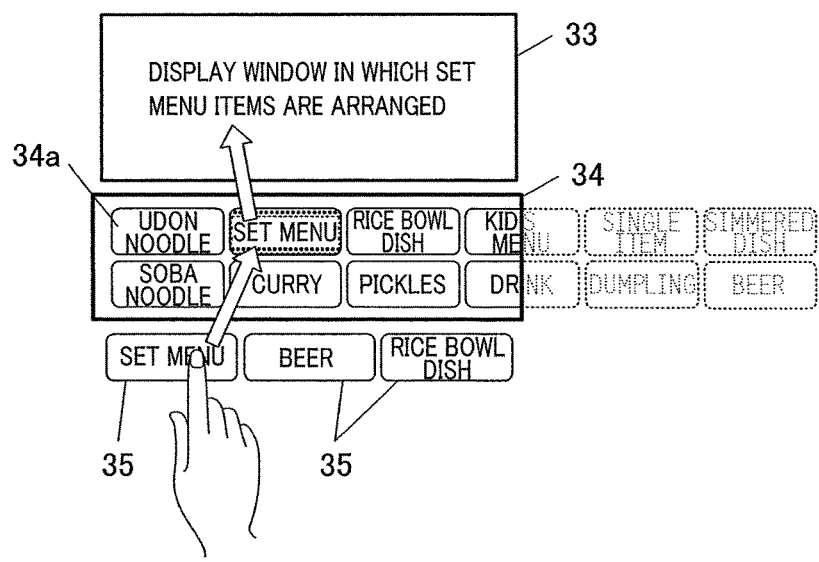
FIGS. 3A and 3B show examples of selection display in the selection display screen.

FIG. 3A is an example of selection display if the shortcut key 35 indicating "set menu" is operated.

As shown in FIG. 3A, in the case where the shortcut key 35 indicating "set menu" is operated, the window in which the set menu items corresponding to the category ("set menu") indicated by the shortcut key 35 are arranged is to be displayed in the window area 33 under the control of the CPU (the second key controller) 11.

Specifically, in such case, since the window selection key 34a indicating "set menu" is displayed in the window selection key area 34 when the shortcut key 35 indicating "set menu" is operated, there is no need to slide the entire window selection keys 34a and the display can be maintained as it is, and the display color of the window selection key 34a indicating "set menu" is changed to a color (for example, blue) which is different from the display color (for example, white) of the other window selection keys 34a and thereafter, the window selection key 34a is displayed. After the display color of the window selection key 34a indicating "set menu" is changed, the window in which set menu items are arranged is to be displayed in the window area 33. Here, the reason why the window in which set menu items are arranged is displayed in the window area 33 after the display color of the window selection key 34a indicating "set menu" is changed is to make it easier for an operator to acknowledge to which category the items corresponding to the item keys 33a displayed in the window area 33 belong.

Figure 3B:
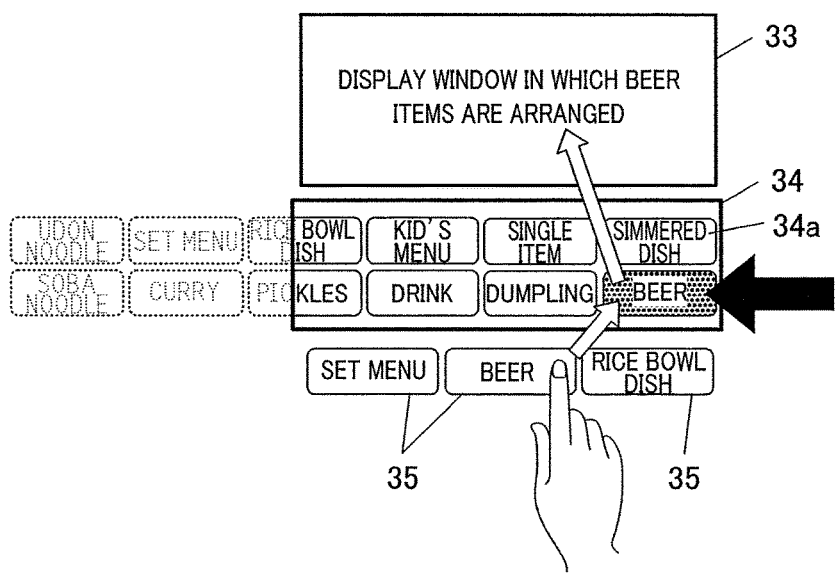

FIG. 3B shows an example of selection display if the shortcut key 35 indicating "beer" is operated when the screen is in the state as shown in FIG. 3A.

As shown in FIG. 3B, in the case where the shortcut key 35 indicating "beer" is operated, the window in which the beer items corresponding to the category ("beer") indicated by the shortcut key 35 are arranged is displayed in the window area 33 under the control of the CPU (the second key controller) 11.

Specifically, in such case, the window selection key 34a indicating "beer" is not displayed in the window selection key area 34 at the timing when the shortcut key 35 indicating "beer" is operated, that is, the screen is in the state as shown in FIG. 3A. Therefore, the entire window selection keys 34a is made to slide in the left direction until the window selection key 34a indicating "beer" appears in the window selection key area 34 and then, the display color of the window selection key 34a indicating "beer" which appeared in the window selection key area 34 needs to be changed to a color (for example, blue) that is different from the display color (for example, white) of the other window selection keys 34a and thereafter, the window selection key 34a is displayed.

After the display color of the window selection key 34a indicating "beer" is changed, the window in which beer items are arranged is to be displayed in the window area 33. The reason why the window in which beer items are arranged is displayed in the window area 33 after the display color of the window selection key 34a indicating "beer" is changed is to make it easier for an operator to acknowledge to which category the items corresponding to the item keys 33a displayed in the window area 33 belong.

Figure 4A:
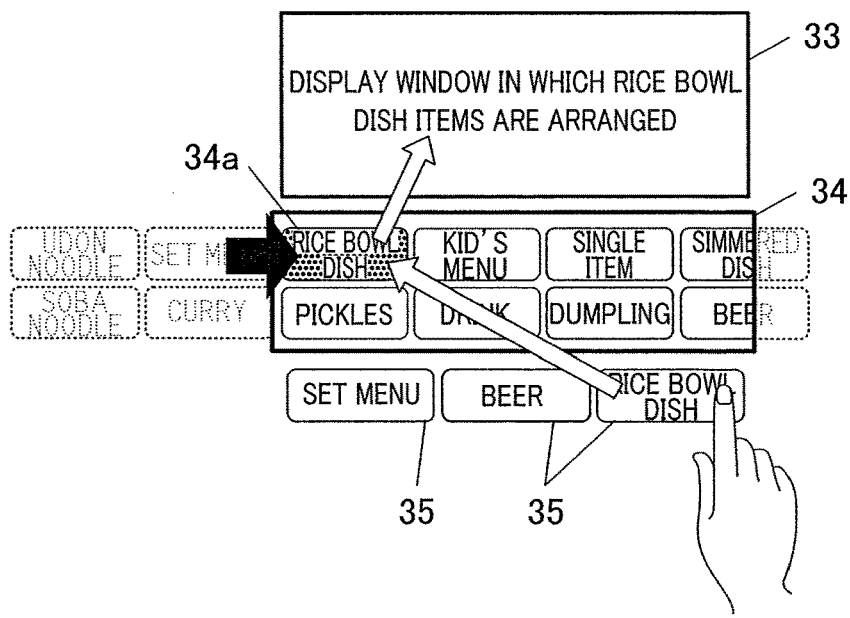
FIGS. 4A and 4B show examples of selection display in the selection display screen.

FIG. 4A shows an example of selection display if the shortcut key 35 indicating "rice bowl dish" is operated when the screen is in the state as shown in FIG. 3B.

As shown in FIG. 4A, in the case where the shortcut key 35 indicating "rice bowl dish" is operated, the window in which the rice bowl dish items corresponding to the category ("rice bowl dish") indicated by the shortcut key 35 are arranged is to be displayed in the window area 33 under the control of the CPU (the second key controller) 11.

Specifically, in such case, the window selection key 34a indicating "rice bowl dish" is not completely displayed in the window selection key area 34 at the timing when the shortcut key 35 indicating "rice bowl dish" is operated, that is, the screen is in the state as shown in FIG. 3B. Therefore, the entire window selection keys 34a is made to slide in the right direction until the window selection key 34a indication "rice bowl dish" appears in the window selection key area 34 and then, the display color of the window selection key 34a indicating "rice bowl dish" which appeared in the window selection key area 34 is changed to a color (for example, blue) different from the display color (for example, white) of the other window selection keys 34a and thereafter, the window selection key 34a is displayed.

After the display color of the window selection key 34a indicating "rice bowl dish" is changed, the window in which the rice bowl dish items are arranged is to be displayed in the window area 33. The reason why the window in which the rice bowl dish items are arranged is displayed in the window area 33 after the display color of the window selection key 34a indicating "rice bowl dish" is changed is to make it easier for an operator to acknowledge to which category the items corresponding to the item keys 33a displayed in the window area 33 belong.

Figure 4B:
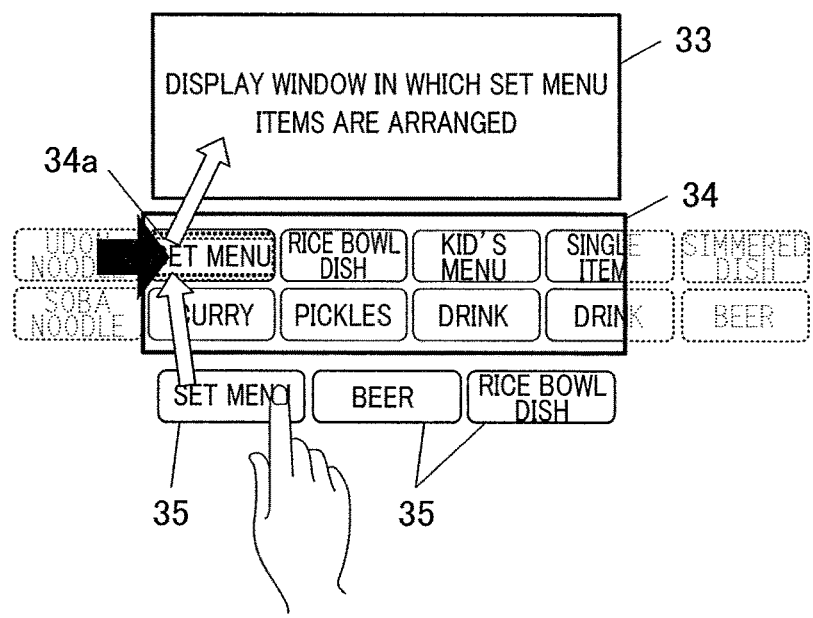

FIG. 4B shows an example of selection display if the shortcut key 35 indicating "set menu" is operated when the screen is in the state as shown in FIG. 4A.

As shown in FIG. 4B, in the case where the shortcut key 35 indicating "set menu" is operated again, the window in which the set menu items corresponding to the category ("set menu") indicated by the shortcut key 35 are arranged is to be displayed in the window area 33 under the control of the CPU (the second key controller) 11.

Specifically, in such case, the window selection key 34a indicating "set menu" is not displayed in the window selection key area 34 at the timing when the shortcut key 35 indicating "set menu" is operated, that is, the screen is in the state as shown in FIG. 4A. Therefore, the entire window selection keys 34a is made to slide in the right direction until the window selection key 34a indicating "set menu" appears in the window selection key area 34 and then, the display color of the window selection key 34a indicating "set menu" which appeared in the window selection key area 34 is changed to a color (for example, blue) which is different from the display color (for example, white) of the other window selection keys 34a and thereafter, the window selection key 34a is displayed.

After the display color of the window selection key 34a indicating "set menu" is changed, the window in which the set menu items are arranged is to be displayed in the window area 33.

In the examples of selection display shown in FIGS. 3A and 3B and in FIGS. 4A and 4B, if a shortcut key 35 is operated, the display color of the window selection key 34a corresponding to the category which the shortcut key 35 indicates is changed to a color different from the display color of the other window selection keys 34a and then, the window selection key 34a is displayed. However, the method for discriminating the window selection key 34a corresponding to the category which a shortcut key 35 indicates from the other window selection keys 34a is not limited to such method.

For example, the window selection key 34a corresponding to the category which the shortcut key 35 indicates may be displayed in a flashing (blinking) manner. Further, only the window selection key 34a corresponding to the category which the shortcut key 35 indicates may be displayed in an enlarged manner in the window selection key area 34.

In the examples of selection display shown in FIG. 3B and in FIGS. 4A and 4B, in the case where the entire window selection keys 34a is made to slide in sideways until the target window selection key 34a which is not displayed in the window selection key area 34 (the window selection key 34a corresponding to the shortcut key 35 which was input by a key operation) appears, the entire window selection keys 34a is made to slide to the bare minimum position where the target window selection key 34a can be just shown. However, the entire window selection keys 34a may be made to slide so that the target window selection key 34a is to be displayed at the center of the window selection key area 34, for example.

Next, the window area setting table 161 will be described with reference to FIG. 5.

The window area setting table 161 is a setting table which defines the item keys 33a which are to be displayed in individual windows that are to be displayed in the window area 33 and the arrangement of the item keys 33a in individual windows.

As shown in FIG. 5, the window area setting table 161 includes the columns of window area number, item key code and item key arrangement coordinates (X-Y). Here, the item key arrangement coordinates (X-Y) show block numbers in each window, each window being sectioned off by X lines and Y rows. Specifically, each block number refers to the $X^{th}$ line from the left and the $Y^{th}$ row from the top in a window.

For example, in the window area setting table 161, the window area number "03", the item key code "001001" and the item key arrangement coordinates (1-1) are made to correspond to each other. That is, the item key 33a of "A set menu" which the item key code "001001" indicates is to be arranged at the $1^{st}$ line from the left and at the $1^{st}$ row from the top in the window (the window area 33 as shown in FIG. 2) relating to "set menu" indicated by the window area number "03".

Next, the window selection key area setting table 162 will be described with reference to FIG. 6.

The window selection key area setting table 162 is a setting table which defines the window selection keys 34a which are to be displayed in the window selection key area 34 and the arrangement of the window selection keys 34a.

As shown in FIG. 6, the window selection key area setting table 162 includes the columns of window selection key code, window selection key coordinates (X-Y), window selection key name and window area number. Here, the window selection key coordinates (X-Y) show block numbers in the window selection key display window which is sectioned off by X lines and Y rows. Specifically, each block number refers to the $X^{th}$ line from the left and the $Y^{th}$ row from the top in the window selection key display window.

For example, in the window selection key area setting table 162, the window selection key code "000001", the window selection key coordinates (1-1), the window selection key name "udon noodle" and the window area number "01" are made to correspond to each other. That is, the window selection key 34a of "udon noodle" which the window selection key code "000001" indicates is to be arranged at the $1^{st}$ line from the left and at the $1^{st}$ row from the top in the window selection key display window (the window selection key area 34 as shown in FIG. 2).

Next, the shortcut key setting table 163 will be described with reference to FIG. 7.

The shortcut key setting table 163 is a setting table which defines the shortcut keys 35 and the arrangement of the shortcut keys 35.

As shown in FIG. 7, the shortcut key setting table 163 includes the columns of shortcut key code, shortcut key coordinate (X) and window selection key code. With respect to the window selection key codes which are set in the shortcut key setting table 163, their settings can be changed by performing a predetermined operation on the operating unit 12, for example. Here, the shortcut key coordinates (X) show block numbers in the shortcut key display window which is sectioned off by X lines. Specifically, each block number refers to the $X^{th}$ line from the left in the shortcut key display window.

For example, in the shortcut key setting table 163, the shortcut key code "900001", the shortcut key coordinate (1) and the window selection key code "000003" are made to correspond to each other. That is, the window selection key 34a of "set menu" which the window selection key code "000003" indicates, this window selection key code being set as the shortcut key code "900001", is to be arranged at the $1^{st}$ line from the left in the shortcut key display window.

In the embodiment, three shortcut keys 35 are displayed in a horizontal line, side by side. However, the shortcut keys 35 may be arranged in any way as long as they are arranged in the selection display screen which is displayed in the display 14. Further, the number of shortcut keys 35 can also be changed as needed.

In the embodiment, settings of the window selection key codes are to be changed by performing a predetermined operation on the operating unit 12 as described above. However, settings of the window selection key codes may be changed by other methods. For example, by counting the selecting frequency of each category (item category) for a predetermined period of time and setting the categories having high selecting frequency (for example, the top three categories) as specific categories under the control of the CPU (counting unit, display controller) 11, the window selection key codes relating to the specific categories can be set as the window selection key codes corresponding to the shortcut key codes. Specifically, under the control of the CPU (counting unit) 11, selecting frequency of each category is obtained by counting the key input frequency of each item key 33a of its corresponding category which is displayed in the window area 33 for one week, for example. Using this counting result, if the three categories of "udon noodle", "soba noodle" and "curry" are determined as being the top three most frequently selected categories (specific categories), the window selection key code "000001" relating to "udon noodle" is set so as to correspond to the shortcut key code "900001", the window selection key code "000002" relating to "soba noodle" is set so as to correspond to the shortcut key code "900002" and the window selection key code "000004" relating to "curry" is set so as to correspond to the shortcut key code "900003" under the control of the CPU (display controller) 11. In such way, the categories of high selecting frequency can be automatically set as shortcut keys. Therefore, there is no need for an operator or the like to set the shortcut keys and can save troubles. Further, since the shortcut keys are set on the basis of the actual measurements, the shortcut keys can be utilized effectively.

Next, the item key setting table 164 will be described with reference to FIG. 8.

The item key setting table 164 is a setting table which defines the item names of individual item keys 33a.

As shown in FIG. 8, the item key setting table 164 includes the columns of item key code and item name.

For example, in the item key setting table 164, the item key code "001212" and the item name "simple udon noodle (kake udon noodle)" are made to correspond to each other. That is, the item name indicated by the item key code "001212" is defined as "simple udon noodle (kake udon noodle)".

Figure 9:
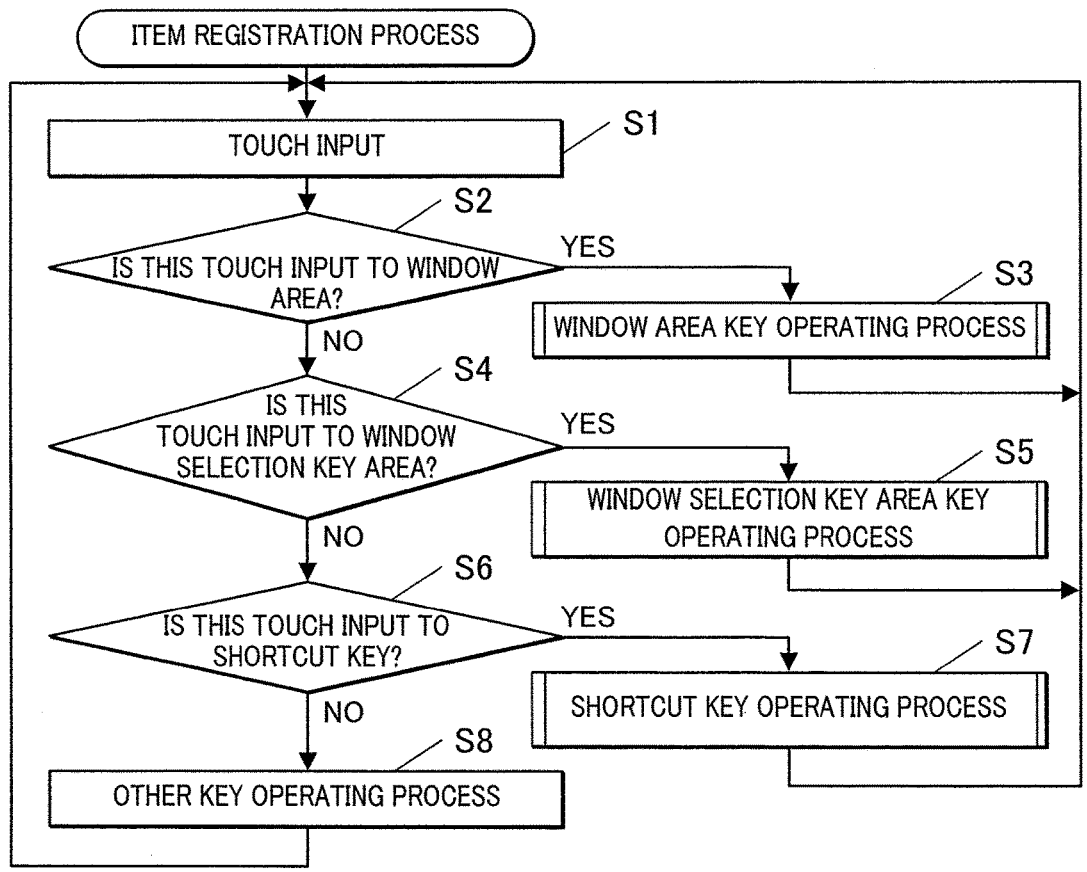
FIG. 9 is a flowchart showing an item registration process.

Next, operation of the ECR 10 will be described with reference to FIGS. 9 to 12. FIG. 9 is a flowchart showing the item registration process.

The item registration process is a process for registering item information (sales data) at the time when a customer makes his/her payment in accordance with input operation performed by an operator. With respect to the ECR 10, turning on of the power or entering of execution instruction of the item registration process performed by a manager of a shop via the operating unit 12 being the trigger, the CPU 11 executes the item registration process in cooperation with the item registration program 151 which is read out from the ROM 15.

As shown in FIG. 9, first, the CPU 11 receives a touch input performed by an operator via the operating unit 12 corresponding to the display screen (the selection display screen; see FIG. 2) shown in the display 14 (step S1). Then, the CPU 11 determines whether the touch input performed in step S1 is to the window area 33 (step S2).

Figure 10:
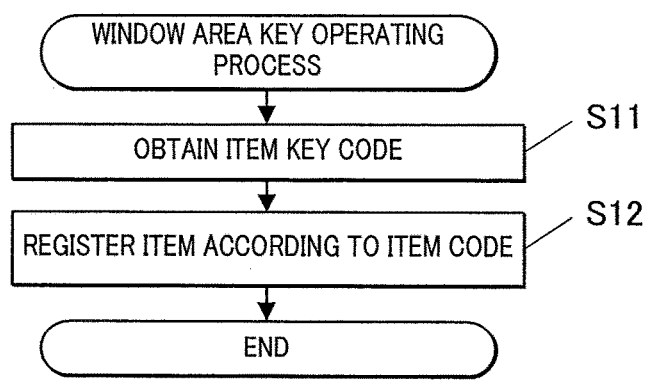
FIG. 10 is a flowchart showing a window area key operation process.

In step S2, if it is determined that the touch input performed in step S1 is to the window area 33 (step S2; YES), the window area key operating process shown in FIG. 10 is executed (step S3). Then, when the window area key operating process ends, the process returns to step S1. Details of the window area key operating process will be described later.

Further, in step S2, if it is determined that the touch input performed in step S1 is not to the window area 33 (step S2; NO), the CPU 11 determines whether the touch input performed in step S1 is to the window selection key area 34 (step S4).

Figure 11:
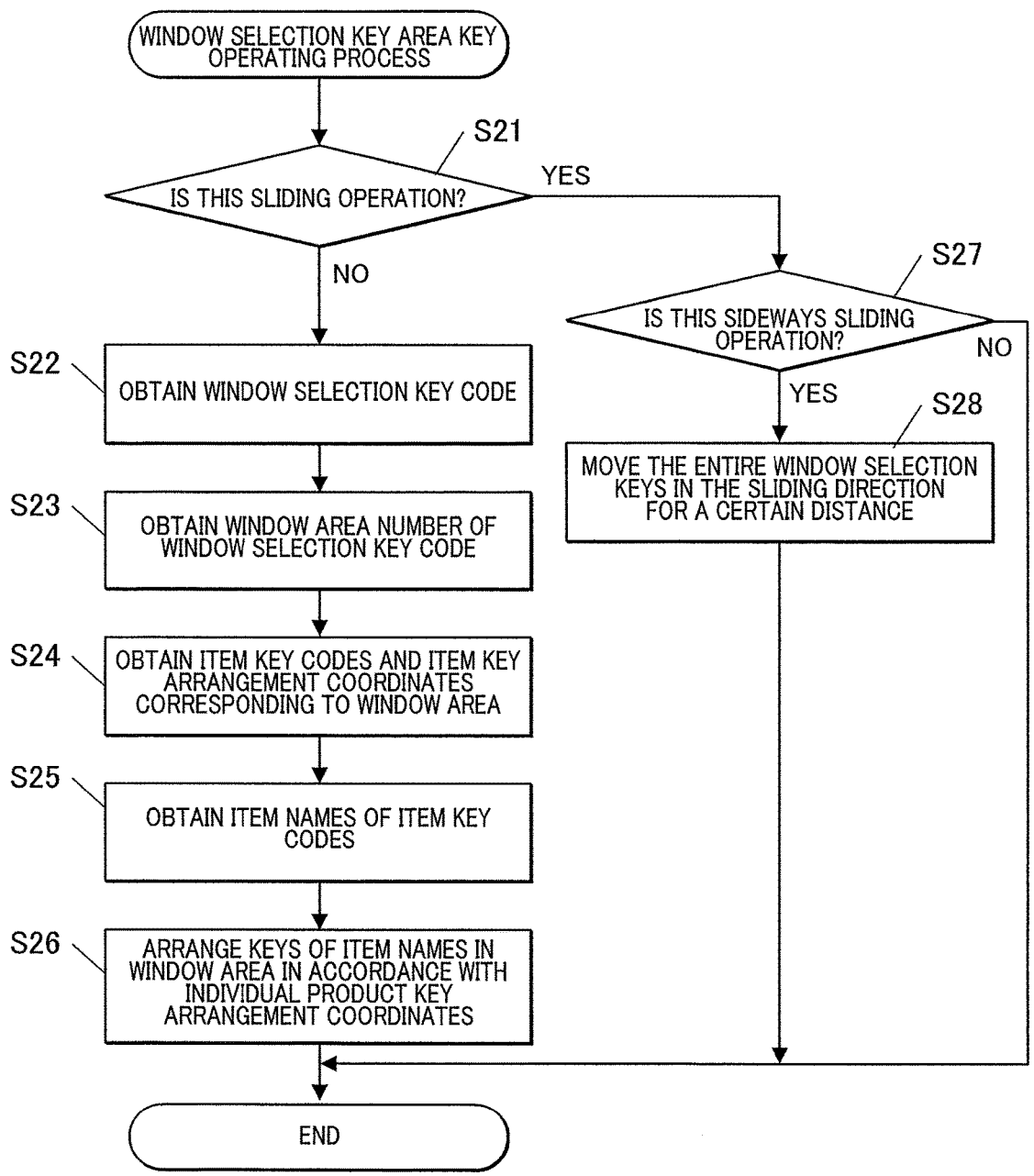
FIG. 11 is a flowchart showing a window selection key area key operation process.

In step S4, if it is determined that the touch input performed in step S1 is to the window selection key area 34 (step S4; YES), the window selection key area key operating process which is shown in FIG. 11 is executed (step S5).

When the window selection key area key operating process ends, the process returns to step S1. Details of the window selection key area key operating process will be described later.

In step S4, if it is determined that the touch input performed in step S1 is not to the window selection key area 34 (step S4; NO), the CPU 11 determines whether the touch input performed in step S1 is to a shortcut key 35 (step S6).

Figure 12:
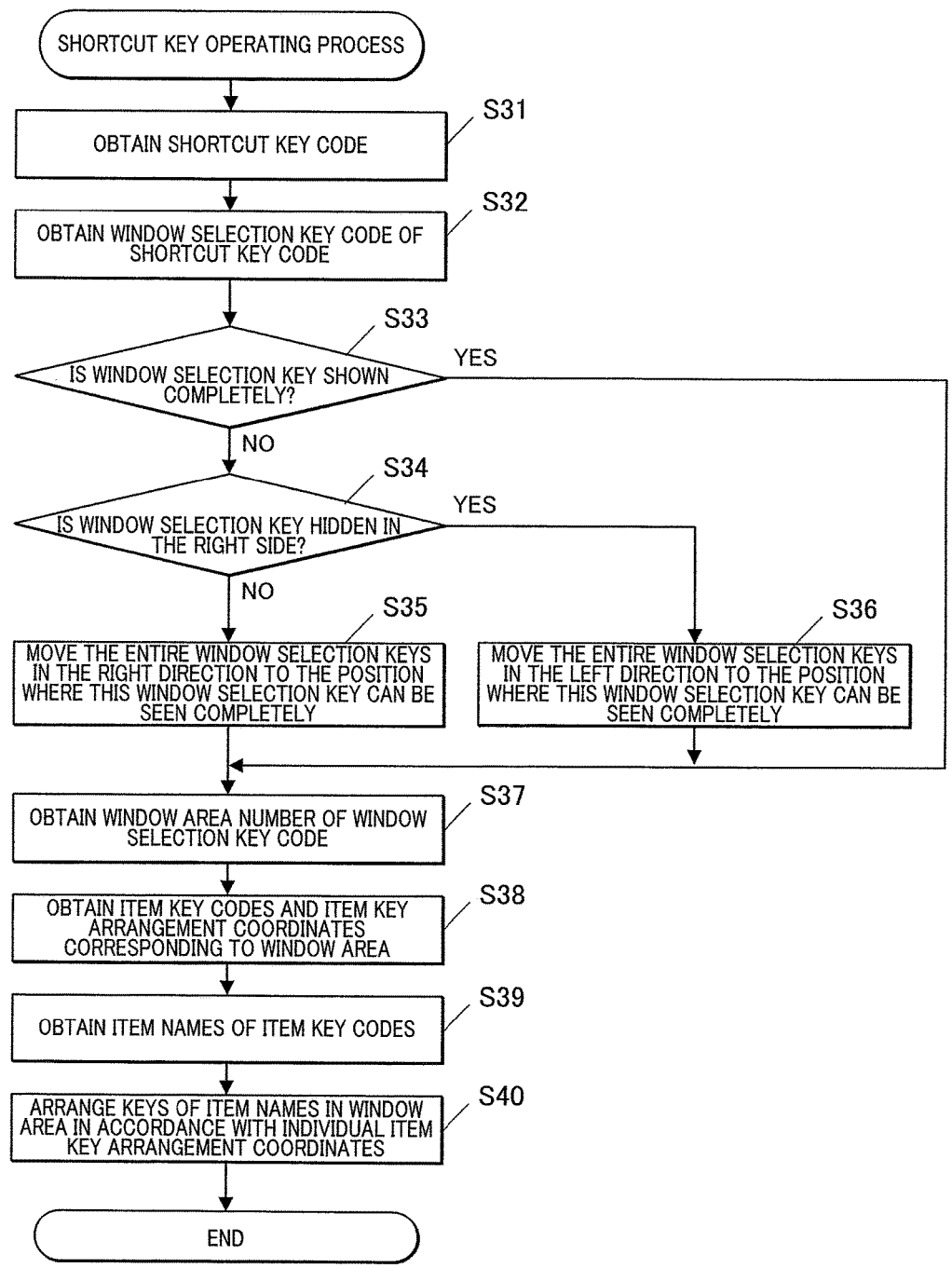
FIG. 12 is a flowchart showing a shortcut key operation process.

In step S6, if it is determined that the touch input performed in step S1 is to a shortcut key 35 (step S6; YES), the shortcut key operating process which is shown in FIG. 12 is executed (step S7). When the shortcut key operating process ends, the process returns to step S1. Details of the shortcut key operating process will be described later.

In step S6, if it is determined that the touch input performed in step S1 is not to a shortcut key 35 (step S6; NO), the CPU 11 executes the key operating process according to another key which was touched and input in step S1 (step S8). When the key operating process of another key ends, the process returns to step S1.

Next, the window area key operating process will be described with reference to FIG. 10. FIG. 10 is a flowchart showing the window area key operating process.

As shown in FIG. 10, first, the CPU 11 refers to the window area setting table 161 which is stored in the storage unit 16 and obtains the item key code of the key (item key 33a) which was touched and input in step S1 from the item key arrangement coordinates of the input key (step S11). Then, the CPU 11 executes the registration process of the item corresponding to the obtained item key code (step S12) and ends the window area key operating process.

Next, the window selection key area key operating process will be described with reference to FIG. 11. FIG. 11 is a flowchart of the window selection key area key operating process.

As shown in FIG. 11, first the CPU 11 determines whether the touch input performed in step S1 is a swiping operation in the window selection key area 34 (step S21).

Whether the touch input performed in step S1 is a swiping operation in the window selection key area 34 is determined on the basis of the contact start position where an operator touched the screen in the window selection key area 34 and the contact release position where the operator lifted up his/her finger from the screen. For example, when an operator touches the screen in the window selection key area 34, the CPU 11 stores the screen contact position. If the CPU 11 determines that the contact release position where the operator lifted up his/her finger from the screen is different from the contact start position, the CPU 11 determines that the touch input performed in step S1 is a swiping operation in the window selection key area 34. Meanwhile, if the CPU 11 determines that the contact release position where the operator lifted up his/her finger from the screen is the same position as the contact start position, the CPU 11 determines that the touch input performed in step S1 is no a swiping operation in the window selection key area 34, that is, the CPU 11 determines that the touch input performed in step S1 is a key input operation at the contact position.

In step S21, if it is determined that the touch input performed in step S1 is not a swiping operation in the window selection key area 34 (step S21; NO), the CPU 11 refers to the window selection key area setting table 162 which is stored in the storage unit 16 and obtains the window selection key code of the key (the window selection key 34a) which was touched and input in step S1 from the window selection key coordinates thereof (step S22). Then, the CPU 11 obtains the window area number that corresponds to the obtained window selection key code (step S23).

Thereafter, the CPU 11 refers to the window area setting table 161 stored in the storage unit 16 and obtains the item key codes and the item key arrangement coordinates corresponding to the window area number obtained in step S23 (step S24).

Then, the CPU 11 refers to the item key setting table 164 stored in the storage unit 16 and obtains the item names corresponding to the item key codes obtained in step S24 (step S25). In accordance with the item key arrangement coordinates obtained in step S24, the CPU 11 arranges (displays) the item keys 33a of the item names obtained in step S25 (step S26) and ends the window selection key area key operating process.

In step S21, if it is determined that the touch input performed in step S1 is a swiping operation in the window selection key area 34 (step S21; YES), the CPU 11 determines whether the swiping operation is the swiping operation in sideways (step S27).

Whether the swiping operation is the swiping operation in sideways is determined on the basis of the contact start position where an operator touched the screen in the window selection key area 34 and the contact release position where the operator lifted up his/her finger from the screen. For example, if an operator touches the screen in the window selection key area 34, the CPU 11 stores the screen contact position.

Then, if the CPU 11 determines that the contact release position where an operator lifted up his/her finger from the screen is on the right side or on the left side of the contact start position, the CPU 11 determines that the swiping operation is the swiping operation in sideways.

Meanwhile, if the CPU 11 determines that the contact release position where an operator lifted up his/her finger from the screen is neither on the right side nor on the left side of the contact start position, the CPU 11 determines that the swiping operation is not the swiping operation in sideways, that is, the CPU 11 determines that the swiping operation is the swiping operation in up and down directions.

In step S27, if the swiping operation is determined as the swiping operation in sideways (step S27; YES), the CPU 11 moves the entire window selection keys 34a in the left direction or in the right direction for a certain distance on the basis of the contact start position and the contact release position (step S28) and ends the window selection key area key operating process.

Meanwhile, in step S27, if the swiping operation is not determined as the swiping operation in sideways (step S27; NO), the CPU 11 controls so as to skip step S28 and ends the window selection key area key operating process.

Next, the shortcut key operating process will be described with reference to FIG. 12. FIG. 12 is a flowchart of the shortcut key operating process.

As shown in FIG. 12, first, the CPU 11 refers to the shortcut key setting table 163 which is stored in the storage unit 16 and obtains the shortcut key code of the key which was touched and input in step S1 (shortcut key 35) from the shortcut key coordinate thereof (step S31). Then, the CPU 11 obtains the window selection key code that corresponds to the obtained shortcut key code (step S32).

Next, the CPU 11 determines whether the window selection key 34a corresponding to the window selection key code obtained in step S32 is completely shown in the window selection key area 34 (step S33).

In step S33, if it is determined that the window selection key 34a is not completely shown in the window selection key area 34 (step S33; NO), the CPU 11 determines whether the window selection key 34a is hidden on the right side of the window selection key area 34 (step S34).

In step S34, if it is determined that the window selection key 34a is not hidden on the right side of the window selection key area 34, that is, the window selection key 34a is hidden on the left side of the window selection key area 34 (step S34; NO), the CPU 11 moves the entire window selection keys 34a in the right direction until the window selection key 34a is completely shown (step S35) and moves on to step S37.

In step S34, if it is determined that the window selection key 34a is hidden on the right side of the window selection key area 34 (step S34; YES), the CPU 11 moves the entire window selection keys 34a in the left direction until the window selection key 34a is completely shown (step S36) and moves on to step S37.

In step S33, if it is determined that the window selection key 34a is completely shown in the window selection key area 34 (step S33; YES), the CPU 11 controls so as to move on to step S37.

Then, the CPU 11 refers to the window selection key area setting table 162 which is stored in the storage unit 16 and obtains the window area number that corresponds to the window selection key code obtained in step S32 (step S37).

Further, the CPU 11 refers to the window area setting table 161 which is stored in the storage unit 16 and obtains the item key codes and the item key arrangement coordinates that correspond to the window area number obtained in step S37 (step S38).

Then, the CPU 11 refers to the item key setting table 164 which is stored in the storage unit 16 and obtains the item names that correspond to the individual item key codes obtained in step S38 (step S39).

Thereafter, in accordance with the item key arrangement coordinates obtained in step S38, the CPU 11 arranges (displays) the item keys 33a of the individual item names obtained in step S39 (step S40) and ends the shortcut key operation process.

As described above, according to the embodiment, in the ECR 10, the window area 33 in which one or a plurality of item keys (item keys 33a), which are used for selecting an item (product), are display according to categories, the window selection key area 34 in which a plurality of window selection keys 34a, which are used for selecting a category of items to be displayed in the window area 33, are displayed, and the shortcut keys 35 for selecting specific categories which are decided under a predetermined condition among the categories are displayed in the display unit (display 14).

Further, in the ECR 10, if one window selection key 34a among the plurality of window selection keys 34a which are displayed in the window selection key area 34 is operated, the item key (item key 33a) corresponding to the category which the window selection key 34a indicates is to be displayed in the window area 33.

Furthermore, in the ECR 10, if a shortcut key 35 is operated, the item keys (item keys 33a) that correspond to the category which the shortcut key 35 indicates are to be displayed in the window area 33.

Thus, by a shortcut key 35 being operated, similarly to the case where the window selection key 34a which corresponds to the category which the shortcut key 35 indicates is operated, the window in which the items belonging to the corresponding category are arranged can be displayed in the window area 33.

Therefore, the desired window can be displayed in the window area 33 efficiently since the trouble of finding the desired window selection key 34a in the plurality of window selection key 34a can be saved.

Further, in the ECR 10, a plurality of window selection keys 34a which are displayed in the window selection key area 34 can be made to slide according to a predetermined operation.

Thus, in the case where an operator wishes to display a window in the window area 33 by operation of the window selection key 34a relevant to the window, the entire window selection keys 34a has to be made to slid by performing the swiping operation in the window selection key area 34 first to make the window selection key 34a which is the operation target appear in the window selection key area 34 if the window selection key 34a which is the operation target is not displayed in the window selection key area 34 (hidden) and this process is time consuming. However, in the case where the shortcut key 35 which corresponds to the window selection key 34a is set, the input operation can be done with this shortcut key 35 and the trouble of performing the swiping operation can be saved. Thus, the desired window can be displayed in the window area 33 efficiently.

Furthermore, if the window selection key 34a which corresponds to the category which the shortcut key 35 indicates is not displayed in the window selection key area 34 when the relevant shortcut key 35 is operated, in the ECR 10, the entire window selection keys 34a is made to slide so that the window selection key 34a is to be displayed in the window selection key area 34.

Further, in the ECR 10, the product keys (item keys 33a) which correspond to the category indicated by the shortcut key 35 are displayed in the window area 33 after the above sliding of the entire window selection keys 34a.

Thus, since the window selection key 34a which corresponds to the category indicated by the shortcut key 35 is also displayed in the window selection key area 34 if the shortcut key 35 is operated, the operation will not have any awkwardness.

Further, it will be easier to acknowledge to which category the items corresponding to the product keys (item keys 33a) displayed in the window area 33 belong.

Moreover, in the ECR 10, the window selection key 34a which corresponds to the category indicated by a shortcut key 35 is displayed so as to be discriminable when the shortcut key 35 is operated. Thus, it is easier the acknowledge to which category the items corresponding to the item keys 33a which are displayed in the window area 33 belong when the shortcut key 35 is operated.

In the above description, an example where the ROM 15 is used as a computer readable medium of a program according to the present invention is shown. However, this is not limitative in any way.

As other computer readable media, a non-volatile memory such as a flash memory, a portable recording medium such as a CD-ROM, etc. can be used.

Further, as a medium which provides data of programs relating to the present invention via a communication line, carrier wave can also be used.

Here, the above embodiment is merely an example of the selection display apparatus and a program according to the present invention and the present invention is not limited to the above embodiment in any way.

For example, in the above embodiment, an example where the selection display apparatus is an ECR is described. However, the selection display apparatus is not limited to ECR in any way. The selection display apparatus may be a POS (Point Of Sales) terminal or the like.

Further, the selection display apparatus may be a touch panel type ordering terminal which is used by customers when placing orders at a restaurant, an eatery or the like, a handy terminal for a customer service staff to input order information, etc.

With respect to the detail configuration and detail operation of each component of the ECR 10 according to the embodiment, they can be modified as needed within the scope of the present invention.

What is claimed is:

1. A selection display apparatus, comprising:
a touch panel type display; and
a processor that executes processes including:
a division process of dividing a display screen of the touch panel type display into at least a category display area, an item display area, and a shortcut key display area;
a first display control process of causing a category arrangement window to be displayed in the category display area so that the category arrangement window is able to slide in the category display area and at least a part of the category arrangement window is displayed, the category arrangement window arranging, according to a predetermined arrangement, a plurality of category selection keys which are made to correspond to respective predetermined categories;
a second display control process of causing a shortcut key which is made to correspond to a predetermined category to be displayed in the shortcut key display area;
a third display control process of causing each item, among a plurality of items included in a category which is made to correspond to a selected category selection key, to be displayed as an item selection key in the item display area when the selected category selection key is selected from among the plurality of category selection keys displayed as the category arrangement window in the category display area, and causing each item, among a plurality of items included in the predetermined category which is made to correspond to the shortcut key, to be displayed as an item selection key in the item display area when the shortcut key is selected; and
a determination process of determining whether a category selection key which is made to correspond to a same category as the predetermined category which is made to correspond to the shortcut key is displayed in the category display area when the shortcut key is selected,
wherein when it is determined in the determination process that the category selection key is not displayed, in the first display control process, the category arrangement window is made to slide to be displayed so that the category selection key which is made to correspond to the same category as the predetermined category which is made to correspond to the selected shortcut key is displayed in the category display area, and the category selection key is displayed in the category display area so as to be discriminable, and
wherein in the division process, the display screen is divided so that the category display area, the item display area, and the shortcut key display area are arranged in a direction orthogonal to a slide movement direction of the category arrangement window.

2. The selection display apparatus of claim 1, wherein, in the first display control process, when a user performs a slide operation to the category arrangement window displayed in the category display area, the category arrangement window displayed in the category display area is made to slide to be displayed in accordance with the slide operation.

3. The selection display apparatus of claim 1, wherein, when it is determined in the determination process that the category selection key is displayed, in the first display control process, the category arrangement window is not made to slide to be displayed, and the category selection key which is made to correspond to the same category as the predetermined category which is made to correspond to the selected shortcut key is displayed in the category display area so as to be discriminable.

4. The selection display apparatus of claim 1, wherein, in the first display control process, the category selection key which is made to correspond to the same category as the predetermined category which is made to correspond to the selected shortcut key is displayed in the category display area so as to be discriminable by changing a display color thereof, performing display thereof in an enlarged manner, or performing display thereof in a blinking manner on the category arrangement window.

5. The selection display apparatus of claim 1, wherein the processor further executes a setting process which obtains a selection state for each of the plurality of category selection keys and sets a category that is made to correspond to the shortcut key based on the selection state, wherein the shortcut key for which the category is set in the setting process is displayed in the second control process, the category being made to correspond to the shortcut key.

6. The selection display apparatus of claim 1, wherein the plurality of category selection keys are arranged in a matrix in the category arrangement window.

7. A selection display method comprising:
a division step of dividing a display screen of a touch panel type display into at least a category display area, an item display area, and a shortcut key display area;
a first display control step of causing a category arrangement window to be displayed in the category display area so that the category arrangement window is able to slide in the category display area and at least a part of the category arrangement window is displayed, the category arrangement window arranging, according to a predetermined arrangement, a plurality of category selection keys which are made to correspond to respective predetermined categories;
a second display control step of causing a shortcut key which is made to correspond to a predetermined category to be displayed in the shortcut key display area;
a third display control step of causing each item, among a plurality of items included in a category which is made to correspond to a selected category selection key, to be displayed as an item selection key in the item display area when the selected category selection key is selected from among the plurality of category selection keys displayed as the category arrangement window in the category display area, and causing each item, among a plurality of items included in the predetermined category which is made to correspond to the shortcut key, to be displayed as an item selection key in the item display area when the shortcut key is selected; and
a determination step of determining whether a category selection key which is made to correspond to a same category as the predetermined category which is made to correspond to the shortcut key is displayed in the category display area when the shortcut key is selected,
wherein when it is determined in the determination step that the category selection key is not displayed, in the first display control step, the category arrangement window is made to slide to be displayed so that the category selection key which is made to correspond to the same category as the predetermined category which is made to correspond to the selected shortcut key is displayed in the category display area, and the category selection key is displayed in the category display area so as to be discriminable, and
wherein in the division step, the display screen is divided so that the category display area, the item display area, and the shortcut key display area are arranged in a direction orthogonal to a slide movement direction of the category arrangement window.

8. The selection display method of claim 7, wherein, in the first display control step, when a user performs a slide operation to the category arrangement window displayed in the category display area, the category arrangement window displayed in the category display area is made to slide to be displayed in accordance with the slide operation.

9. The selection display method of claim 7, wherein, when it is determined in the determination step that the category selection key is displayed, in the first display control step, the category arrangement window is not made to slide to be displayed, and the category selection key which is made to correspond to the same category as the predetermined category which is made to correspond to the selected shortcut key is displayed in the category display area so as to be discriminable.

10. The selection display method of claim 7, wherein, in the first display control step, the category selection key which is made to correspond to the same category as the predetermined category which is made to correspond to the selected shortcut key is displayed in the category display area so as to be discriminable by changing a display color thereof, performing display thereof in an enlarged manner, or performing display thereof in a blinking manner on the category arrangement window.

11. The selection display method of claim 7, further comprising a setting step which obtains a selection state for each of the plurality of category selection keys and sets a category that is made to correspond to the shortcut key based on the selection state, wherein the shortcut key for which the category is set in the setting step is displayed in the second control step, the category being made to correspond to the shortcut key.

12. The selection display method of claim 7, wherein the plurality of category selection keys are arranged in a matrix in the category arrangement window.

13. A non-transitory computer readable recording medium storing therein a program to make a computer perform processes comprising:
a division process of dividing a display screen of a touch panel type display into at least a category display area, an item display area, and a shortcut key display area;
a first display control process of causing a category arrangement window to be displayed in the category display area so that the category arrangement window is able to slide in the category display area and at least a part of the category arrangement window is displayed, the category arrangement window arranging, according to a predetermined arrangement, a plurality of category selection keys which are made to correspond to respective predetermined categories;

a second display control process of causing a shortcut key which is made to correspond to a predetermined category to be displayed in shortcut key display area;

a third display control process of causing each item, among a plurality of items included in a category which is made to correspond to a selected category selection key, to be displayed as an item selection key in the item display area when the selected category selection key is selected from among the plurality of category selection keys displayed as the category arrangement window in the category display area, and causing each item, among a plurality of items included in the predetermined category which is made to correspond to the shortcut key, to be displayed as an item selection key in the item display area when the shortcut key is selected; and a determination process of determining whether a category selection key which is made to correspond to a same category as the predetermined category which is made to correspond to the shortcut key is displayed in the category display area when the shortcut key is selected, wherein when it is determined in the determination process that the category selection key is not displayed, in the first display control process, the category arrangement window is made to slide to be displayed so that the category selection key which is made to correspond to the same category as the predetermined category which is made to correspond to the selected shortcut key is displayed in the category display area, and the category selection key is displayed in the category display area so as to be discriminable, and wherein in the division process, the display screen is divided so that the category display area, the item display area, and the shortcut key display area are arranged in a direction orthogonal to a slide movement direction of the category arrangement window.

14. The non-transitory computer readable recording medium of claim 13, wherein, in the first display control process, when a user performs a slide operation to the category arrangement window displayed in the category display area, the category arrangement window displayed in the category display area is made to slide to be displayed in accordance with the slide operation.

15. The non-transitory computer readable recording medium of claim 13, wherein, when it is determined in the determination process that the category selection key is displayed, in the first display control process, the category arrangement window is not made to slide to be displayed, and the category selection key which is made to correspond to the same category as the predetermined category which is made to correspond to the selected shortcut key is displayed in the category display area so as to be discriminable.

16. The non-transitory computer readable recording medium of claim 13, wherein, in the first display control process, the category selection key which is made to correspond to the same category as the predetermined category which is made to correspond to the selected shortcut key is displayed in the category display area so as to be discriminable by changing a display color thereof, performing display thereof in an enlarged manner, or performing display thereof in a blinking manner on the category arrangement window.

17. The non-transitory computer readable recording medium of claim 13, wherein the program further makes the computer perform a setting process which obtains a selection state for each of the plurality of category selection keys and sets a category that is made to correspond to the shortcut key based on the selection state, wherein the shortcut key for which the category is set in the setting process is displayed in the second control process, the category being made to correspond to the shortcut key.

18. The non-transitory computer readable recording medium of claim 13, wherein the plurality of category selection keys are arranged in a matrix in the category arrangement window.

\* \* \* \* \*